Patented Aug. 23, 1932

1,873,901

UNITED STATES PATENT OFFICE

STUART PARMELEE MILLER, OF NEW YORK, N. Y., ASSIGNOR TO THE BARRETT COMPANY, OF NEW YORK, N. Y., A CORPORATION OF NEW JERSEY

ELIMINATION OF PHENOLS AND OTHER LIQUORS

No Drawing.   Application filed June 30, 1927.   Serial No. 202,738.

This invention relates to the removal of phenols from phenol-containing liquors, such as waste liquor from ammonia stills, and particularly from ammoniacal liquors before subjecting them to distillation to remove ammonia therefrom.

Phenols, even in very small amounts, are objectionable in waste liquors, particularly where the waste liquors are discharged into rivers or other bodies of water from which drinking water is obtained. Various methods have been proposed for removing phenols from such liquors, among them being the extraction of the phenols from the liquor with benzol or light oils made up largely of benzol. Such recovery methods, however, are expensive because of the large amount of benzol required and the large losses due to its volatility and its solubility in the extracted liquors.

The present invention provides an improved process in which losses of the extracting oils are reduced and minimized, and other objections to the use of a highly volatile material such as benzol avoided.

According to the present invention, the phenols are extracted from the phenol-containing liquors with an oil having a boiling point above that of water, and which is free or substantially free from benzol, and which is free or contains only relatively small amounts of toluol, but which oil has a specific gravity sufficiently less than that of water to allow of satisfactory decantation. The oil employed is, moreover, a neutral oil, which is itself free from phenols.

The heavy oil employed in the process of the present invention may be one which is obtained by the distillation of coke oven light oil to remove the benzol and most or all of the toluol therefrom, and by treating the resulting heavy oil to separate phenols therefrom, leaving a heavy neutral oil of a specific gravity materially less than that of water. The heavy oil, without such extraction of phenols, is not well adapted for use, because the amount of phenols contained therein is ordinarily such as would result in the extraction of phenols from the oil by the phenol-containing liquor, rather than extraction of phenols from the liquor by the oil. It will be appreciated that the phenol-containing liquor may contain only around 1.5 to 3 grams of phenols per liter, all or practically all of which must be eliminated from the liquor, before it can be discharged into sources of potable water.

The oil employed for the extraction of the phenols from the liquor in the process of the present invention is more advantageously produced directly from hot coal distillation gases by subjecting these gases to a cleaning treatment at an elevated temperature to remove heavier tar and pitch constituents therefrom, and by subsequently cooling the gases under regulated conditions, as by fractional condensation, to separate therefrom directly an oil having the proper specific gravity and boiling point and which, after extraction of phenols therefrom, will be a neutral oil of a specific gravity lighter than water and free, or relatively free, from benzol and toluol. Such oils can be directly recovered from normal coke oven gases, or from gases enriched by the distillation of tar or oils therewith at an elevated temperature, by cleaning the gases with an electrical precipitator at an elevated temperature, then cooling the gases under regulated conditions to separate an oil therefrom of the desired specific gravity and boiling point, and extracting such oils to remove phenols therefrom. Such methods of producing directly recovered clean oils, free from tarry material, are described in my prior applications, Serial Nos. 171,955, 181,366, 188,438, 197,029 and 199,644.

If the directly recovered oil has too wide a boiling point range or too high a specific gravity, it may be subjected to further fractionation, either to remove lighter constituents, leaving a residue of the desired specific gravity and boiling point, or by fractionating the oil and condensing the fraction of the desired specific gravity and boiling point. Directly recovered oils having a specific gravity less than water may contain considerable naphthalene. If the naphthalene content is such that naphthalene tends to crystallize out on cooling, it should either be used at a temperature above that of naphthalene separation or it should also be freed or partly freed from naphthalene as well as from phenols. A naphthalene containing oil may for example be allowed to cool to crystallize the greater part of the naphthalene therefrom and the remaining oil then drained from the naphthalene. Either before or after the separation of naphthalene the oil should be treated to remove phenols therefrom and to give a neutral oil for use in the present process.

The specific gravity of the oil employed in the present process is less than that of water, and it is important that it should be in order to promote ready separation of the oil from the liquor after the intimate intermixture thereof for effecting the extraction. The oil may, for example, have a specific gravity around 0.90 to 0.92 or higher, but in general should be not over 0.970 specific gravity. The oil should be free or freed from all or substantially all benzol which it may contain, and it should also be advantageously freed or nearly freed from toluol, which, although it has a boiling point of around 110° C., is sufficiently volatile so that more or less of it readily volatilizes during the process. As an example of a suitable oil may be mentioned one having an initial boiling point at around 125 to 135° C., of which approximately one-half boils below 160 to 170° C., and of which the greater part, i. e., approximately ninety percent, boils below 200° C., and which is free or substantially free from constituents boiling above 220° or 230° C. Such an oil will contain appreciable quantities of xylols and but very little toluol and practically no benzol, and will be a thinly fluid oil at ordinary temperatures, or at least will not contain sufficient naphthalene as to be troublesome. Such oil should be freed from phenols before use, for example, by extracting it with a ten percent caustic soda solution.

The very small amount of phenols which waste liquors contain, and the necessity of removing all or substantially all of this small amount of phenols, requires the use of a relatively large amount of the solvent extractive oil and intimate contact of the liquor therewith.

The extraction process can advantageously be carried out as a continuous counter-current extraction process, with counter-current flow of the liquor to be extracted and of the heavy oil employed for the extraction. Owing to the low specific gravity of the oil, it will tend to rise in and separate from the liquor, so that the oil can be introduced into the bottom of a body of liquor and agitated therein and permitted to collect at and escape from the top of the body, or the liquor may be introduced at the top of a body of the oil and permitted to pass downwardly thereto with agitation to bring about intimate intermixture of the oil and liquor.

Instead of carrying out the extraction in a continuous counter-current manner, successive batches of the liquor can be extracted with the oil progressively, and the individual batches of liquor extracted by successive amounts of oil, using fresh oil, free from phenols, for completing the extraction of the phenols from the liquor. The desired intimacy of intermixture of the liquor and oil can be obtained by suitable agitating means, as will be readily understood, or by passing the oils and liquor counter-current through towers filled with packing materials.

After the extraction the oil will contain small amounts of phenols or tar acids. The oil can be recirculated on fresh amounts of liquor to build up the phenol content, but after it reaches a certain concentration the oil must be extracted to remove phenols therefrom and to regenerate fresh amounts of oil for further use in the extraction process.

This extraction of the oils to remove phenols therefrom may be effected with a solution of a phenol-combining agent, such as a solution of caustic soda of ten percent strength, although more concentrated or more dilute solutions can be employed. The caustic soda solution can be brought into intimate contact with the oil to cause combination of the phenols with the caustic soda to produce sodium phenolates in solution, after which the oil can be separated from the caustic solution by settling. The oil can then be employed for further extraction of phenols from the waste liquor.

The caustic soda solution containing the phenolate can be used over and over again until it becomes exhausted and no longer effective for the extraction of the phenols. It can then be treated for the separation and recovery of the phenols, for example, by subjecting it to action of carbon dioxide to set free the phenols and to form sodium carbonate, and by completing the setting free of the phenols by the addition of a small amount of sulphuric acid to the tar acids after separation from the sodium carbonate solution. The phenols so obtained will be impure and can be further refined or purified to convert them into commercial products or refined products.

Instead of treating waste liquor, such as the liquor from ammonia stills, the improved process of the present invention can advantageously be applied to ammoniacal liquor before the distillation of ammonia therefrom, for example, to the weak ammoniacal liquor before it goes to the ammonia still. The treatment of such ammoniacal liquor to free it from phenols gives a phenol-free liquor, which can then be subjected to distillation for the removal of ammonia therefrom, leaving a waste liquor which will be directly produced free or substantially free from phenols.

The extraction of phenols before the distillation of ammonia from the liquor has the further advantage that such amounts of the oil employed for the extraction as may remain dissolved in or admixed with the liquor will be distilled therefrom in the ammonia still, and will be carried over and recovered in the ordinary recovery system through which the gases from the ammonia still are passed.

I claim:

1. The method of removing phenols from phenol-containing liquors, which comprises subjecting the liquor to extraction with a neutral coal tar oil having a specific gravity materially less than that of water, such oil being substantially free from benzol.

2. The method of removing phenols from phenol-containing liquors, which comprises subjecting the liquor to extraction with a neutral coal tar oil having a specific gravity materially less than that of water, such oil being substantially free from benzol, and containing not more than small amounts of toluol.

3. The method of separating phenols from phenol-containing liquors, which comprises subjecting the liquor to prolonged countercurrent intimate contact with a neutral coal tar oil having a minimum boiling point higher than that of toluol, and a specific gravity less than that of water.

4. The method of separating phenols from phenol-containing liquors, which comprises subjecting the liquor to repeated extraction with a neutral coal tar oil having a minimum boiling point higher than that of toluol and a specific gravity less than that of water.

5. The method of removing phenols from phenol-containing liquors, which comprises subjecting the liquor to extraction with a neutral coal tar oil having a specific gravity materially less than that of water, such oil being substantially free from benzol, subjecting the resulting phenol-containing oil to extraction with a phenol-combining agent to remove the phenols therefrom, and extracting further amounts of the liquor with the resulting oil.

6. The method of removing phenols from phenol-containing liquors, which comprises subjecting the liquor to extraction with a neutral coal tar oil having a specific gravity materially less than that of water, such oil being substantially free from benzol, and containing not more than small amounts of toluol, subjecting the resulting phenol-containing oil to extraction with a phenol-combining agent to remove the phenols therefrom, and extracting further amounts of the liquor with the resulting oil.

7. The method of removing phenols from phenol-containing liquors, which comprises extracting the phenol-containing liquors with clean neutral coal tar oils having a specific gravity less than that of water and substantially free from benzol and toluol, prepared by cleaning coal distillation gases at a high temperature, cooling the clean gases to separate clean oils and then removing phenols from such clean oils.

8. The method of removing phenols from ammoniacal liquors, which comprises subjecting such liquors to extraction with a coal tar oil having a specific gravity less than water and substantially free from benzol and toluol, and subsequently subjecting the phenol-freed liquor to distillation for the recovery of ammonia therefrom.

9. The method of separating phenols from phenol-containing liquors, which comprises subjecting the liquor to prolonged countercurrent contact with a neutral coal tar oil having a minimum boiling point higher than that of benzol and a specific gravity less than that of water.

10. The method of separating phenols from phenol-containing liquors, which comprises subjecting the liquor to extraction with a neutral coal tar oil having a minimum boiling point higher than that of benzol and a specific gravity less than that of water.

11. The method of separating phenols from phenol-containing liquors, which comprises subjecting the liquor to extraction with a neutral coal tar oil having an initial boiling point at least 125° C. and having a specific gravity less than that of water.

12. The method of removing phenols from waste liquors of ammonia stills which comprises extracting said liquor with a neutral coal tar oil having a specific gravity materially less than that of water and having an initial boiling point of about 125° to 135° C., said oil being substantially free from benzol.

13. The method of removing phenols from phenol containing liquors which comprises extracting the liquor with a neutral coal tar oil having a specific gravity of about 0.90 to 0.97 and being substantially free from benzol.

14. The method of removing phenols from phenol containing liquors which comprises extracting an aqueous liquor containing about 1.5 to 3.0 grams of phenols per liter with a neutral coal tar oil having a specific gravity materially less than that of water and having an initial boiling point of about 125° to 135° C., such oil being substantially free from benzol.

15. The method of removing phenols from phenol containing liquors which comprises extracting an aqueous liquor containing about 1.5 to 3.0 grams of phenols per liter with a neutral coal tar oil having a specific gravity of about 0.90 to 0.97 and an initial boiling point of about 125° to 135° C., said oil being substantially free from constituents boiling above 230° C. and from benzol.

In testimony whereof I affix my signature.

STUART PARMELEE MILLER.